US011601933B2

(12) United States Patent
Lee et al.

(10) Patent No.: US 11,601,933 B2
(45) Date of Patent: *Mar. 7, 2023

(54) TECHNIQUES AND APPARATUSES FOR SLOT-BASED AND NON-SLOT-BASED SCHEDULING IN 5G

(71) Applicant: QUALCOMM Incorporated, San Diego, CA (US)

(72) Inventors: Heechoon Lee, San Diego, CA (US); Joseph Binamira Soriaga, San Diego, CA (US); Jing Sun, San Diego, CA (US); Jing Jiang, San Diego, CA (US); Wanshi Chen, San Diego, CA (US); Peter Gaal, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/949,970

(22) Filed: Nov. 23, 2020

(65) Prior Publication Data
US 2021/0076375 A1 Mar. 11, 2021

Related U.S. Application Data

(63) Continuation of application No. 16/170,705, filed on Oct. 25, 2018, now Pat. No. 10,849,123.

(30) Foreign Application Priority Data

Nov. 17, 2017 (GR) .............................. 20170100519

(51) Int. Cl.
H04W 4/00 (2018.01)
H04W 72/0446 (2023.01)
(Continued)

(52) U.S. Cl.
CPC ...... *H04W 72/0446* (2013.01); *H04W 72/042* (2013.01); *H04W 72/1289* (2013.01); *H04W 84/045* (2013.01); *H04W 88/02* (2013.01)

(58) Field of Classification Search
CPC .. H04W 72/042; H04W 76/27; H04L 5/0053; H04L 5/0055; H04L 1/1812
See application file for complete search history.

(56) References Cited

U.S. PATENT DOCUMENTS 10,849,123 B2 * 11/2020 Lee .................. H04W 72/0446
2012/0093120 A1 * 4/2012 Ko ...................... H04L 5/0048
370/329

(Continued)

FOREIGN PATENT DOCUMENTS

WO 2010129605 A1 11/2010
WO 2017169008 A1 10/2017

OTHER PUBLICATIONS

Huawei, et al., "UE Procedure of PDCCH Monitoring for URLLC," 3GPP Draft; 3GPP TSG RAN WG1 Meeting #90bis, R1-1717084, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Oct. 9, 2017-Oct. 13, 2017, Oct. 8, 2017, XP051340275, 6 pages, Retrieved from the Internet: URL: http://www.3gpp.org/ftp/Meetings_3GPP_SYNC/RAN1/Docs/ [retrieved on Oct. 8, 2017].

(Continued)

Primary Examiner — Atique Ahmed
(74) Attorney, Agent, or Firm — Harrity & Harrity, LLP

(57) ABSTRACT

Various aspects of the present disclosure generally relate to wireless communication. In some aspects, a user equipment (UE) may receive control information for a communication of the UE; and determine whether the control information is associated with a slot-based control configuration or a non-slot-based control configuration based at least in part on (Continued)

the control information; or determine whether the communication is associated with a slot-based data configuration or a non-slot-based data configuration. Numerous other aspects are provided.

30 Claims, 12 Drawing Sheets

(51) Int. Cl.
  *H04W 72/12* (2023.01)
  *H04W 72/04* (2023.01)
  *H04W 84/04* (2009.01)
  *H04W 88/02* (2009.01)

(56) References Cited

U.S. PATENT DOCUMENTS

| | | | |
|---|---|---|---|
| 2013/0044664 A1* | 2/2013 | Nory | H04L 1/0045 370/336 |
| 2014/0098780 A1 | 4/2014 | Kim et al. | |
| 2014/0105155 A1 | 4/2014 | Kim et al. | |
| 2014/0301345 A1 | 10/2014 | Kim et al. | |
| 2015/0003356 A1* | 1/2015 | Seo | H04L 5/0058 370/329 |
| 2018/0070369 A1* | 3/2018 | Papasakellariou | H04W 16/14 |
| 2019/0132824 A1* | 5/2019 | Jeon | H04L 5/0092 |
| 2019/0150142 A1* | 5/2019 | Huang | H04W 72/0446 370/336 |
| 2019/0182829 A1* | 6/2019 | Choi | H04W 72/0446 |

OTHER PUBLICATIONS

International Search Report and Written Opinion—PCT/US2018/057701—ISA/EPO—dated Jan. 18, 2019.
International Preliminary Report on Patentability—PCT/US2018/057701 The International Bureau of WIPO—Geneva, Switzerland, dated May 28, 2020.
LG Electronics: "Discussion on DCI Design," 3GPP Draft; R1-1702581 Discussion on NR DCI Design, 3rd Generation Partnership Project (3GPP), Mobile Competence Centre; 650, Route Des Lucioles; F-06921 Sophia-Antipolis Cedex; France, vol. RAN WG1, No. Athens; Feb. 13, 2017-Feb. 17, 2017, Feb. 12, 2017, XP051209735, 6 pages, Retrieved from the Internet: URL: http://www.3gpp.org/ftp/Meetings_3GPP_SYNC/RAN1/Docs/ [retrieved on Feb. 12, 2017].
Samsung: "On Search Space Design," 3GPP Draft; R1-1717642 on Search Space Design, 3rd Generation Partnership Project (3GPP), Mobile Competence Centre; 650, Route Des Lucioles; F-06921, Sophia-Antipolis Cedex; France, vol. RAN WG1, No. Prague, CZ; Oct. 9, 2017-Oct. 13, 2017, Oct. 8, 2017, XP051340828, 8 pages, Retrieved from the Internet: URL: http://www.3gpp.org/ftp/Meetings_3GPP_SYNC/RAN1/Docs/ [retrieved on Oct. 8, 2017].
Samsung Electronics: Choi S., et al., "Method and Apparatus for Transmitting and Receiving Group Downlink Control Channel in Wireless Communication System", Year: 2017, pp. 1-27.
Taiwan Search Report—TW107137968—TIPO—dated Nov. 8, 2021.
Taiwan Search Report—TW107137968—TIPO—dated Jun. 21, 2022.

* cited by examiner

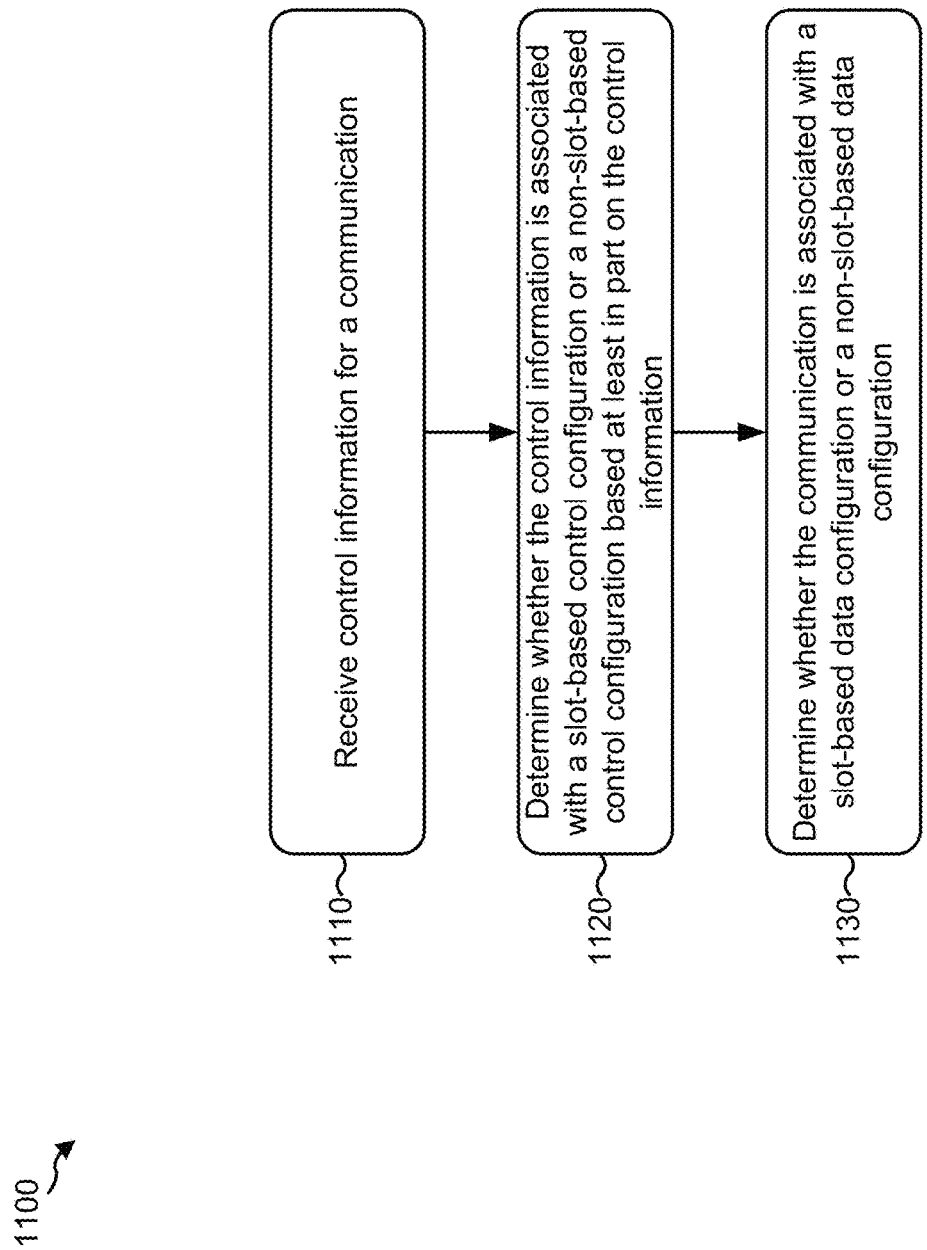

TECHNIQUES AND APPARATUSES FOR SLOT-BASED AND NON-SLOT-BASED SCHEDULING IN 5G

CROSS-REFERENCE TO RELATED APPLICATIONS UNDER 35 U.S.C. § 119

This application is a continuation of U.S. patent application Ser. No. 16/170,705, filed Oct. 25, 2018, entitled "TECHNIQUES AND APPARATUSES FOR SLOT-BASED AND NON-SLOT-BASED SCHEDULING IN 5G," (now U.S. Pat. No. 10,849,123), which claims priority to Greek Patent Application No. 20170100519, filed on Nov. 17, 2017, entitled "TECHNIQUES AND APPARATUSES FOR SLOT-BASED AND NON-SLOT-BASED SCHEDULING IN 5G," which are hereby expressly incorporated by reference herein.

FIELD OF THE DISCLOSURE

Aspects of the present disclosure generally relate to wireless communication, and more particularly to techniques and apparatuses for slot-based and non-slot based scheduling in 5G.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a UE may include receiving control information for a communication of the UE; and determining whether the control information is associated with a slot-based control configuration or a non-slot-based control configuration based at least in part on the control information; or determining whether the communication is associated with a slot-based data configuration or a non-slot-based data configuration.

In some aspects, a UE for wireless communication may include a memory and one or more processors configured to receive control information for a communication of the UE; and determine whether the control information is associated with a slot-based control configuration or a non-slot-based control configuration based at least in part on the control information; or determine whether the communication is associated with a slot-based data configuration or a non-slot-based data configuration.

In some aspects, a non-transitory computer-readable medium may store one or more instructions for wireless communication. The one or more instructions, when executed by one or more processors of a UE, may cause the one or more processors to receive control information for a communication of the UE; and determine whether the control information is associated with a slot-based control configuration or a non-slot-based control configuration based at least in part on the control information; or determine whether the communication is associated with a slot-based data configuration or a non-slot-based data configuration.

In some aspects, an apparatus for wireless communication may include means for receiving control information for a communication of the apparatus; and means for determining whether the control information is associated with a slot-based control configuration or a non-slot-based control configuration based at least in part on the control information; or means for determining whether the communication is associated with a slot-based data configuration or a non-slot-based data configuration.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed, for example, by a user equipment, in accordance with various aspects of the present disclosure.

DETAILED DESCRIPTION

Figure 1:
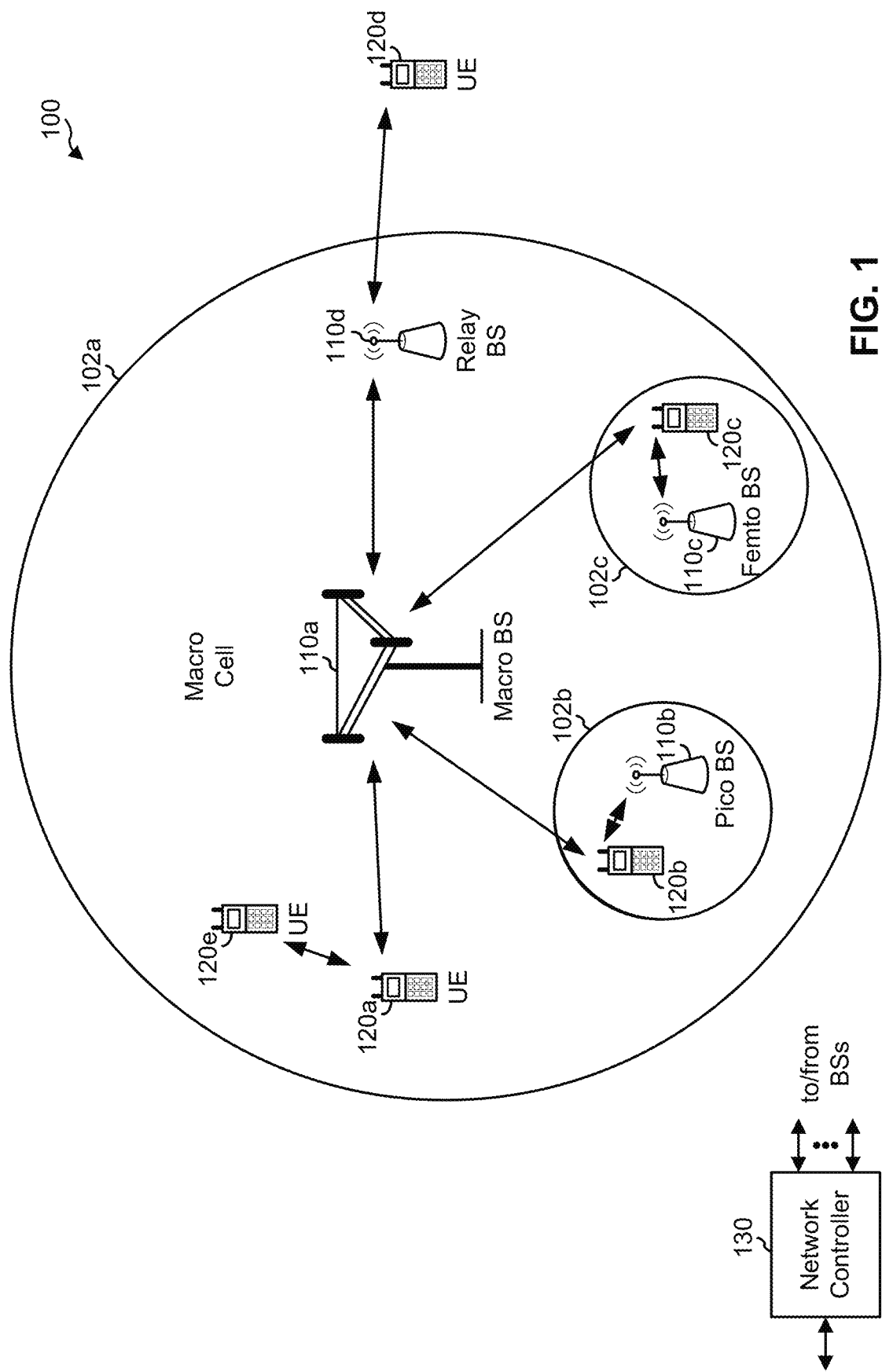
FIG. 1 is a block diagram conceptually illustrating an example of a wireless communication network, in accordance with various aspects of the present disclosure.

New Radio (NR) may support slot-based scheduling and non-slot-based scheduling. Slot-based scheduling may be associated with a slot-based control configuration and a slot-based data configuration, and non-slot-based scheduling may be associated with a non-slot-based control configuration and a non-slot-based data configuration. In a slot-based control configuration, control information for the UE is provided in a DL control region of the slot, whereas in a non-slot-based control configuration, control information may be provided anywhere in the slot, including the DL control region. In a slot-based data configuration, a demodulation reference signal (DMRS) may be located in a different location than in a non-slot-based data configuration. For the above reasons, slot-based scheduling may be associated with a different processing timeline than non-slot-based scheduling. Therefore, a UE may need to know whether a grant uses slot-based scheduling or non-slot-based scheduling to determine an appropriate timeline for processing the control information, and whether the grant is for a communication associated with a slot-based data configuration or a non-slot-based data configuration to determine a DMRS configuration of the communication.

Some techniques and apparatuses described herein provide determination of whether control information is associated with a slot-based control configuration or a non-slot-based control configuration and/or whether a communication associated with the control information is associated with a slot-based data configuration or a non-slot-based data configuration. This may enable a UE to determine where a reference signal (e.g., a demodulation reference signal (DMRS)) will be located for the communication and/or to determine a processing timeline for the control information. In this way, usage of slot-based scheduling and non-slot-based scheduling is enabled and efficiency of signaling regarding slot-based or non-slot-based control configuration may be improved, thereby improving usage of network resources.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Scheduling may be performed on a slot-based or non-slot-based basis, as described in more detail below.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
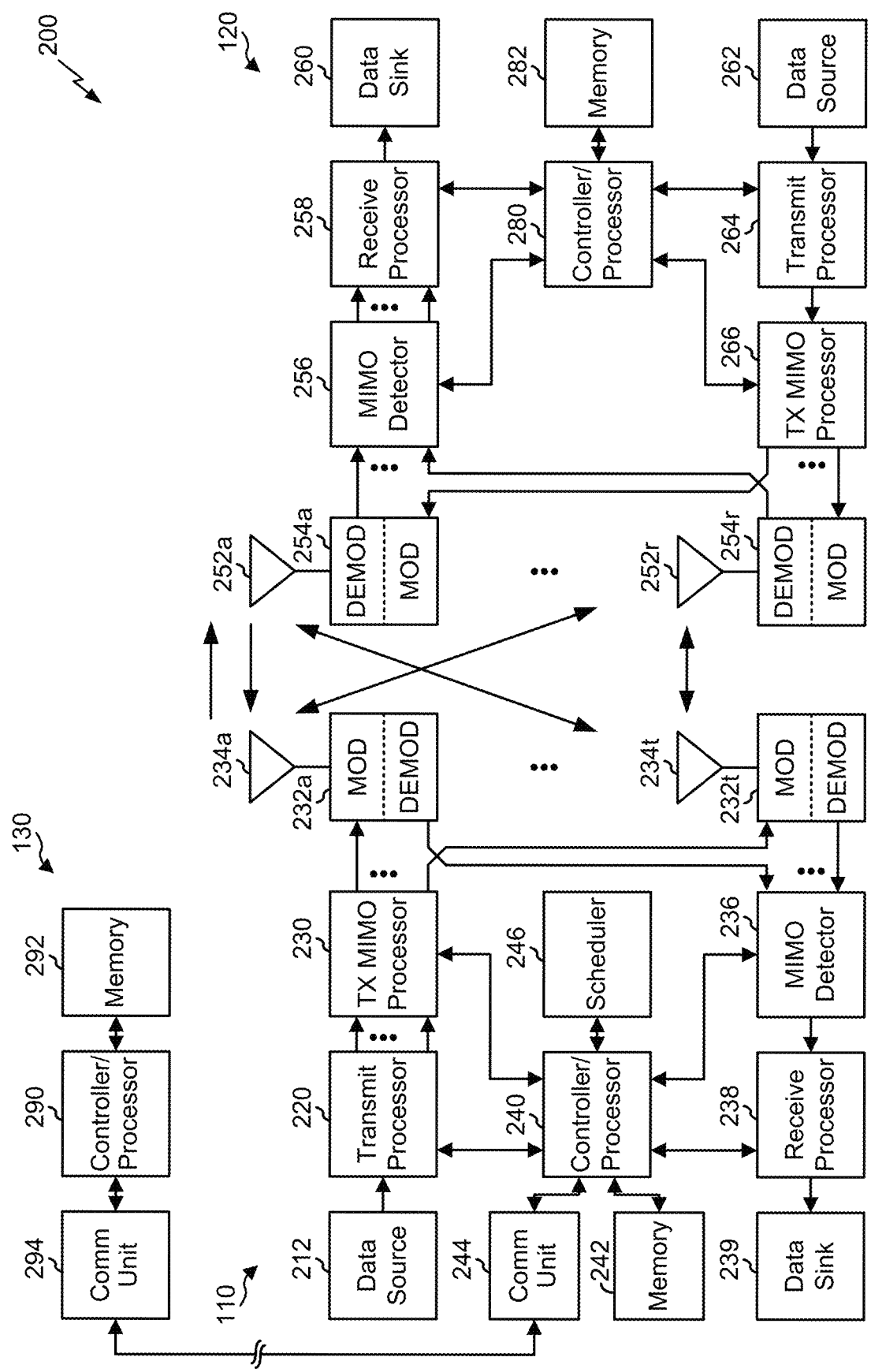
FIG. 2 is a block diagram conceptually illustrating an example 200 of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS) or demodulation reference signal (DMRS)) and synchronization signals (e.g., the primary synchronization signal (PSS) and secondary synchronization signal (SSS)) in particular locations based at least in part on a data configuration of a communication to be transmitted. A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with determination of whether control information and/or a corresponding communication are associated with a slot-based or non-slot-based configuration, as described in more detail elsewhere herein. For example, controller/processor 240 of BS 110, controller/processor 280 of UE 120, and/or any other component(s) of FIG. 2 may perform or direct operations of, for example, process 1100 of FIG. 11 and/or other processes as described herein. Memories 242 and 282 may store data and program codes for BS 110 and UE 120, respectively. A scheduler 246 may schedule UEs for data transmission on the downlink and/or uplink.

The stored program codes, when executed by controller/processor 280 and/or other processors and modules at UE 120, may cause the UE 120 to perform operations described with respect to process 1100 of FIG. 11 and/or other processes as described herein. A scheduler 246 may schedule UEs for data transmission on the downlink and/or uplink.

In some aspects, UE 120 may include means for receiving control information for a communication of the UE 120, means for determining whether the control information is associated with a slot-based control configuration or a non-slot-based control configuration based at least in part on the control information, means for determining whether the communication is associated with a slot-based data configuration or a non-slot-based data configuration, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples are possible and may differ from what was described with regard to FIG. 2.

Figure 3A:
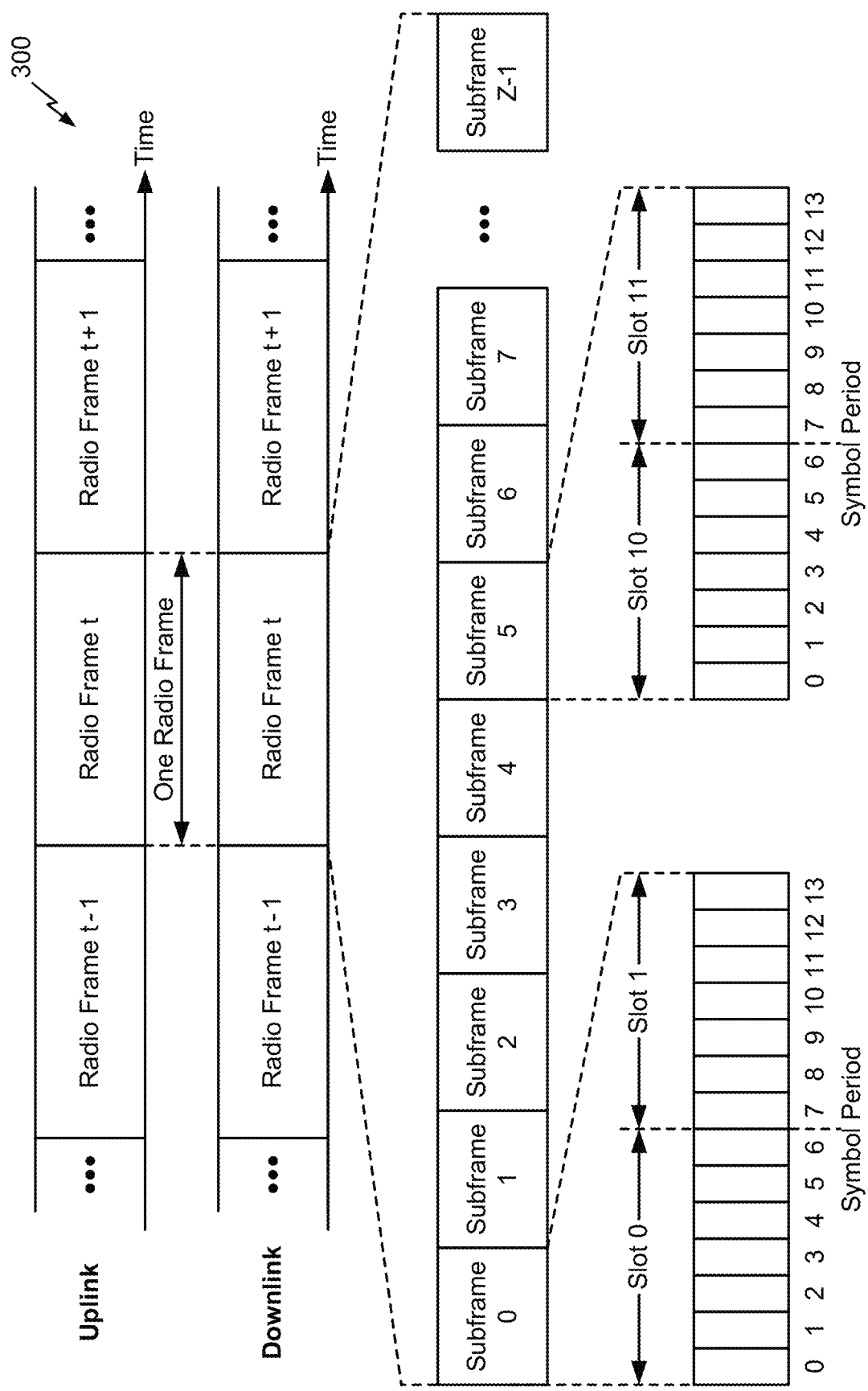
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Any number of slots may be used in each subframe, although some configurations use between 1 and 32 slots based at least in part on a subcarrier spacing of the frame. Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
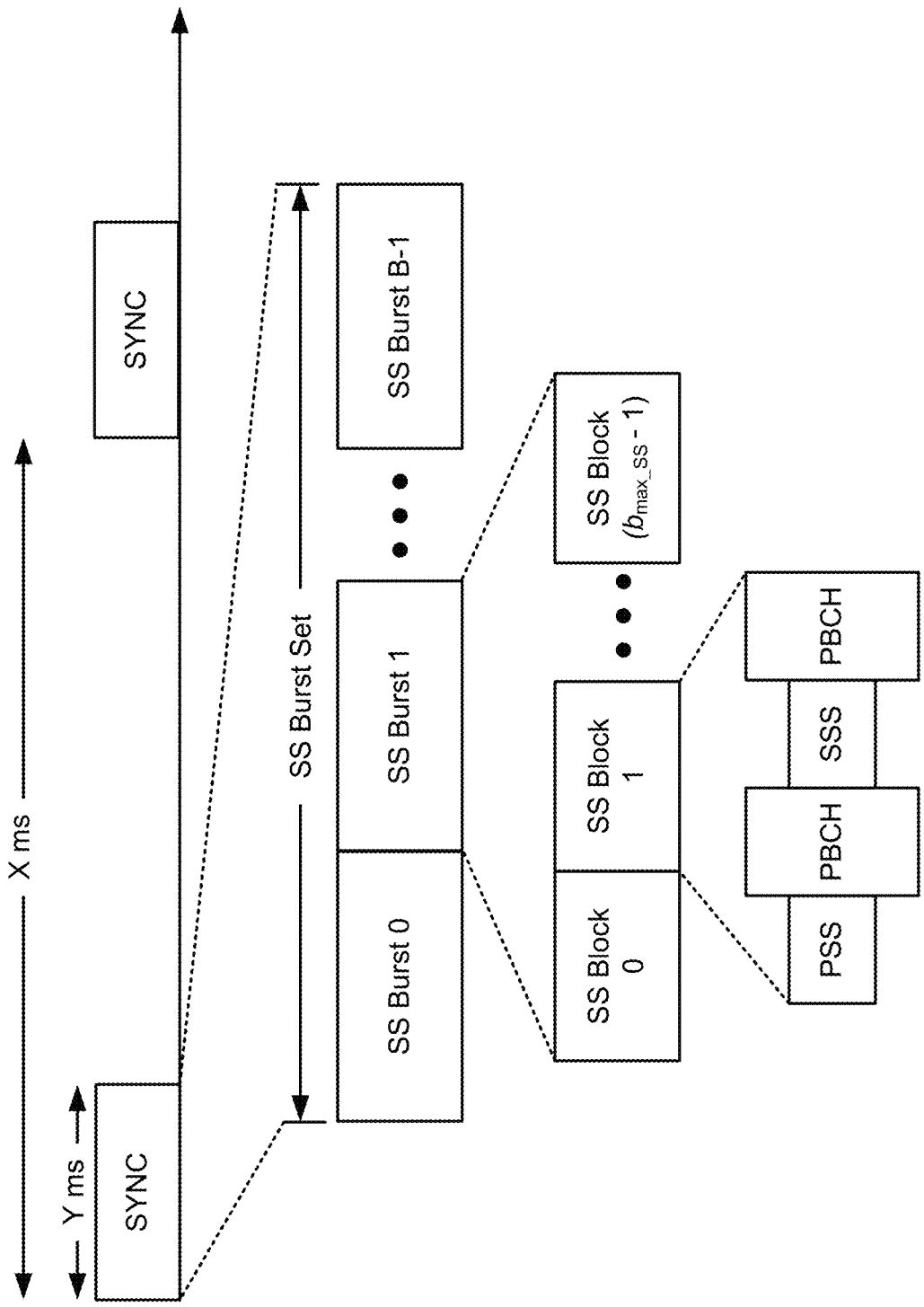
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols). In some aspects, the SS block may be multiplexed with a data communication, such as a remaining minimum system information communication, in a data channel.

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
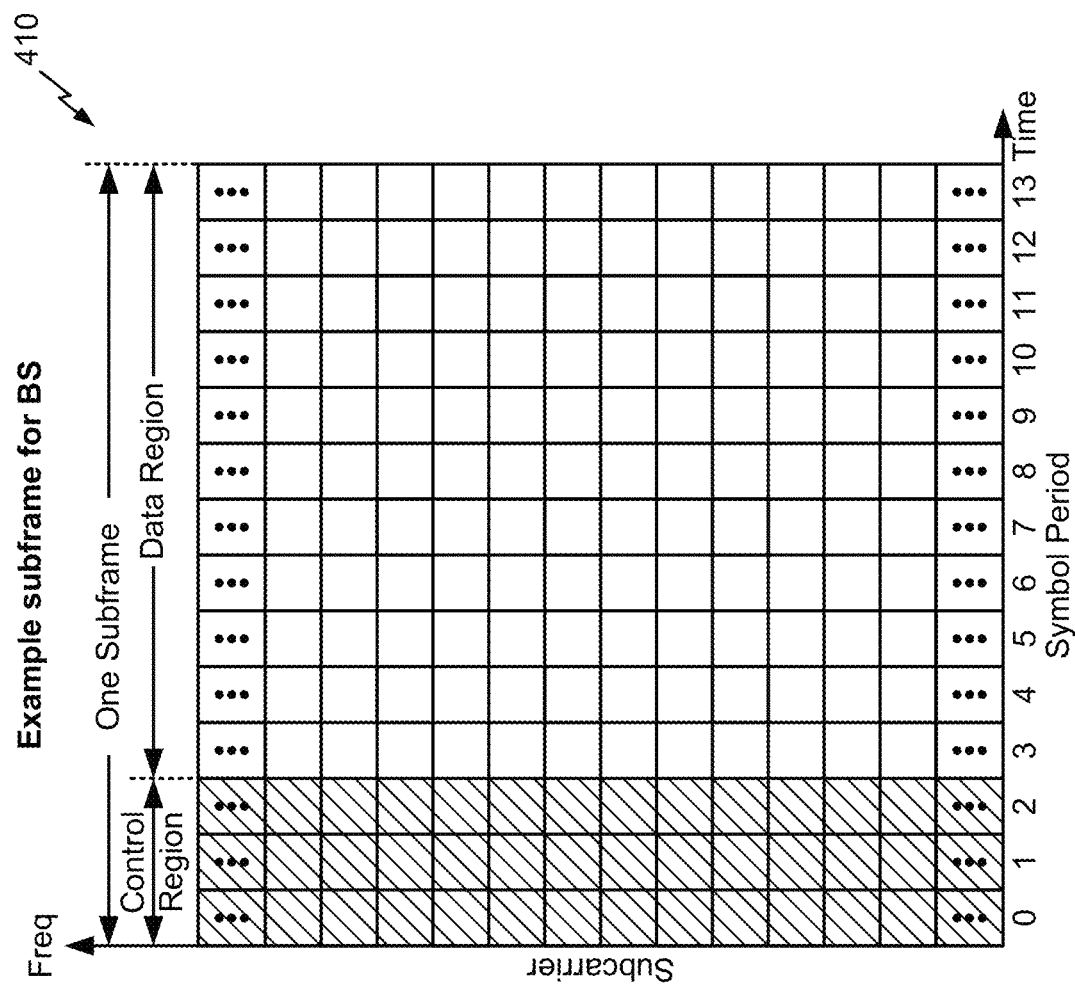
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (EMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
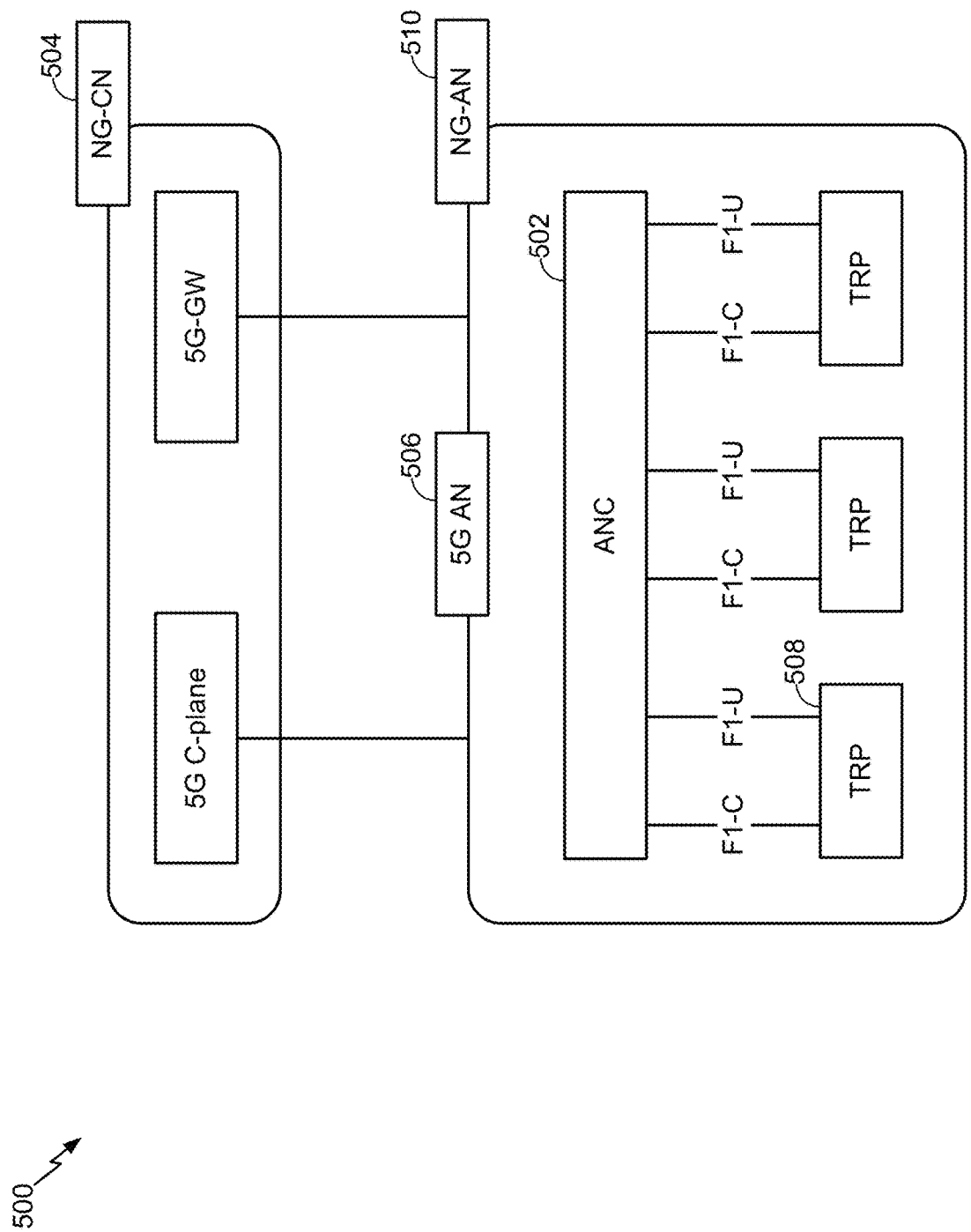
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. In some aspects, the ANC 502 may perform scheduling of a subordinate entity. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
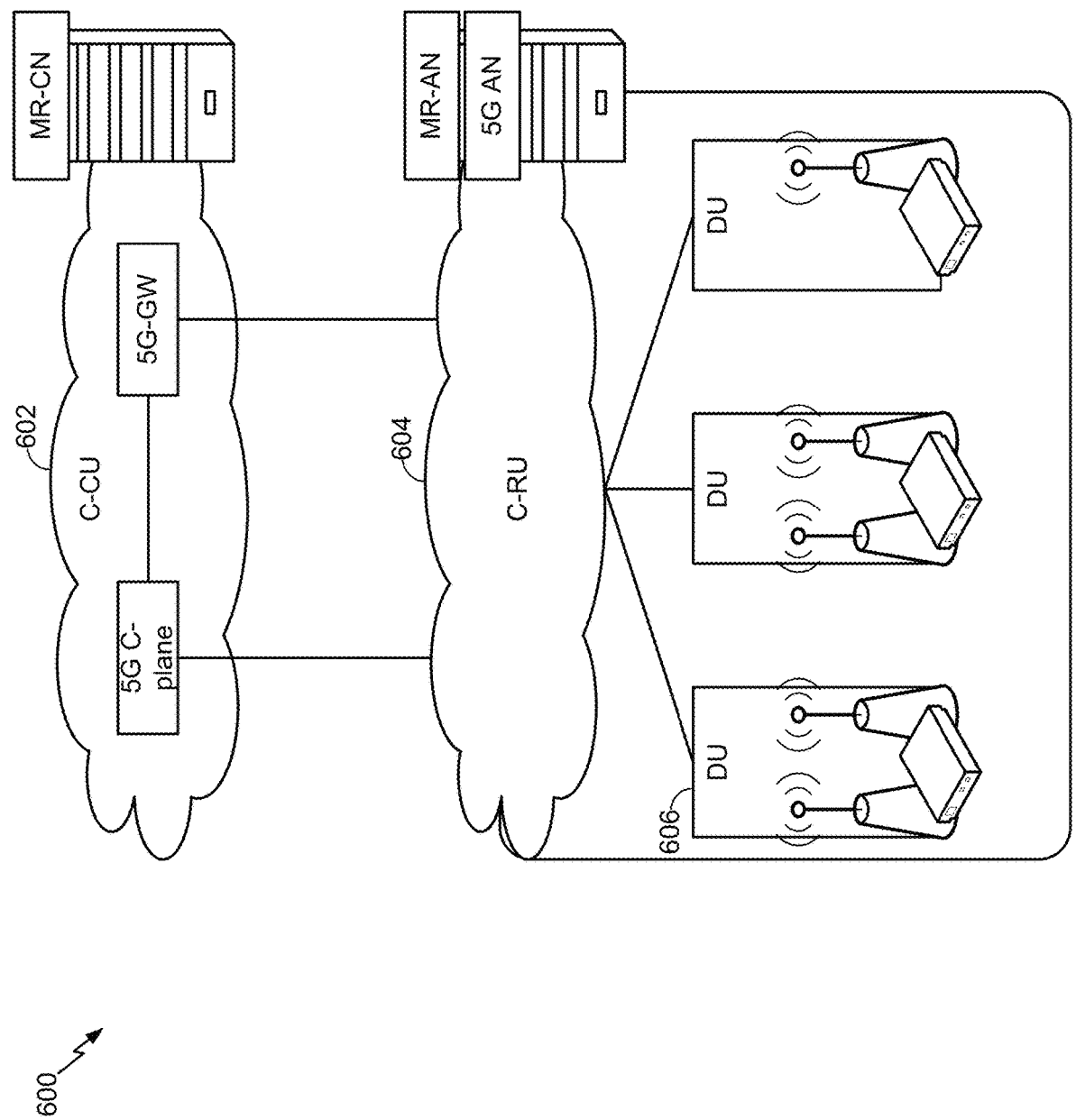
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7:
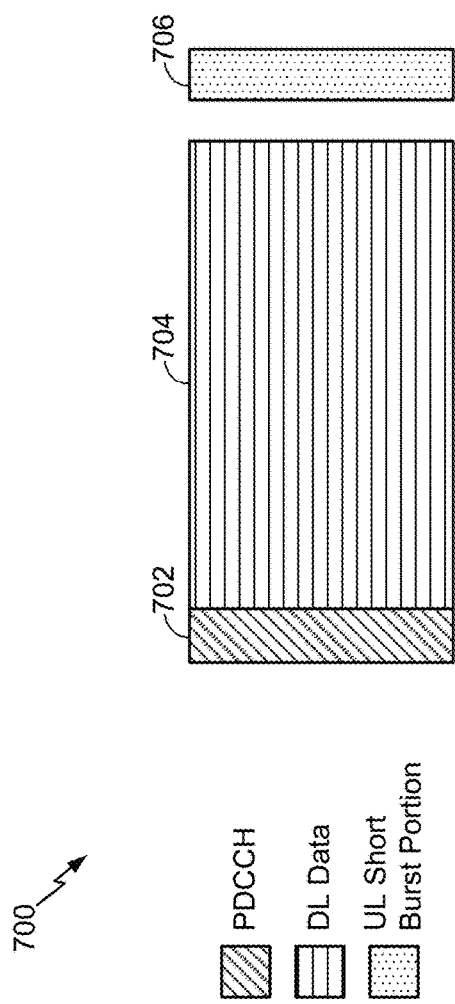
FIG. 7 is a diagram illustrating an example of a downlink (DL)-centric subframe, in accordance with various aspects of the present disclosure.

FIG. 7 is a diagram 700 showing an example of a DL-centric slot or wireless communication structure. The DL-centric slot may include a control portion 702. The control portion 702 may exist in the initial or beginning portion of the DL-centric slot. The control portion 702 may include various scheduling information and/or control information corresponding to various portions of the DL-centric slot. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PCFICH)), one or more grants (e.g., downlink grants, uplink grants, etc.), and/or the like. For a slot-based control configuration, the control portion 702 may carry control information for a communication to be transmitted or received in the DL data portion 704.

The DL-centric slot may also include a DL data portion 704. The DL data portion 704 may sometimes be referred to as the payload of the DL-centric slot. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH). For a non-slot-based control configuration, control information may be received in the DL data portion 704 or the control portion 702.

The DL-centric slot may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric slot. For example, the UL short burst portion 706 may include feedback information corresponding to the control portion 702 and/or the DL data portion 704. Non-limiting examples of information that may be included in the UL short burst portion 706 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a hybrid automatic repeat request (HARQ) indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

Figure 8:
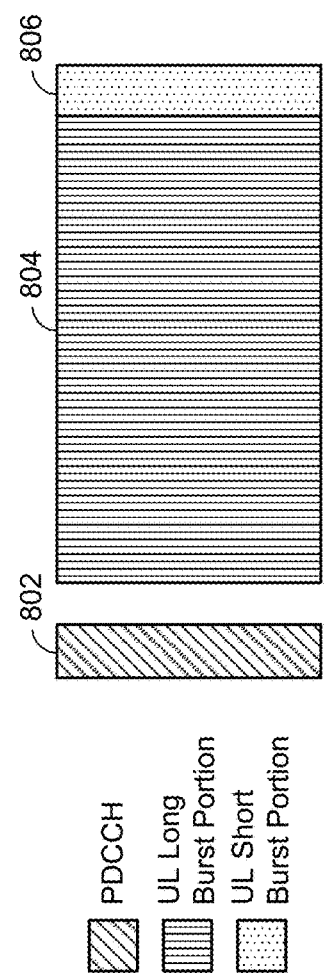
FIG. 8 is a diagram illustrating an example of an uplink (UL)-centric subframe, in accordance with various aspects of the present disclosure.

FIG. 8 is a diagram 800 showing an example of an UL-centric slot or wireless communication structure. The UL-centric slot may include a control portion 802. The control portion 802 may exist in the initial or beginning portion of the UL-centric slot. The control portion 802 in FIG. 8 may be similar to the control portion 702 described above with reference to FIG. 7. The UL-centric slot may also include an UL long burst portion 804. The UL long burst portion 804 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 802 may be a physical DL control channel (PDCCH). For a slot-based control configuration, control information for a communication of the UE 120 may be received in the control portion 802.

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In one example, a wireless communication structure, such as a frame or subframe, may include both UL-centric slots and DL-centric slots. In this example, the ratio of UL-centric slots to DL-centric slots in a frame may be dynamically adjusted based at least in part on the amount of UL data and the amount of DL data that are transmitted. For example, if there is more UL data, then the ratio of UL-centric slots to DL-centric slots may be increased. Conversely, if there is more DL data, then the ratio of UL-centric slots to DL-centric slots may be decreased.

As indicated above, FIG. 8 is provided merely as an example. Other examples are possible and may differ from what was described with regard to FIG. 8.

Figure 9A:
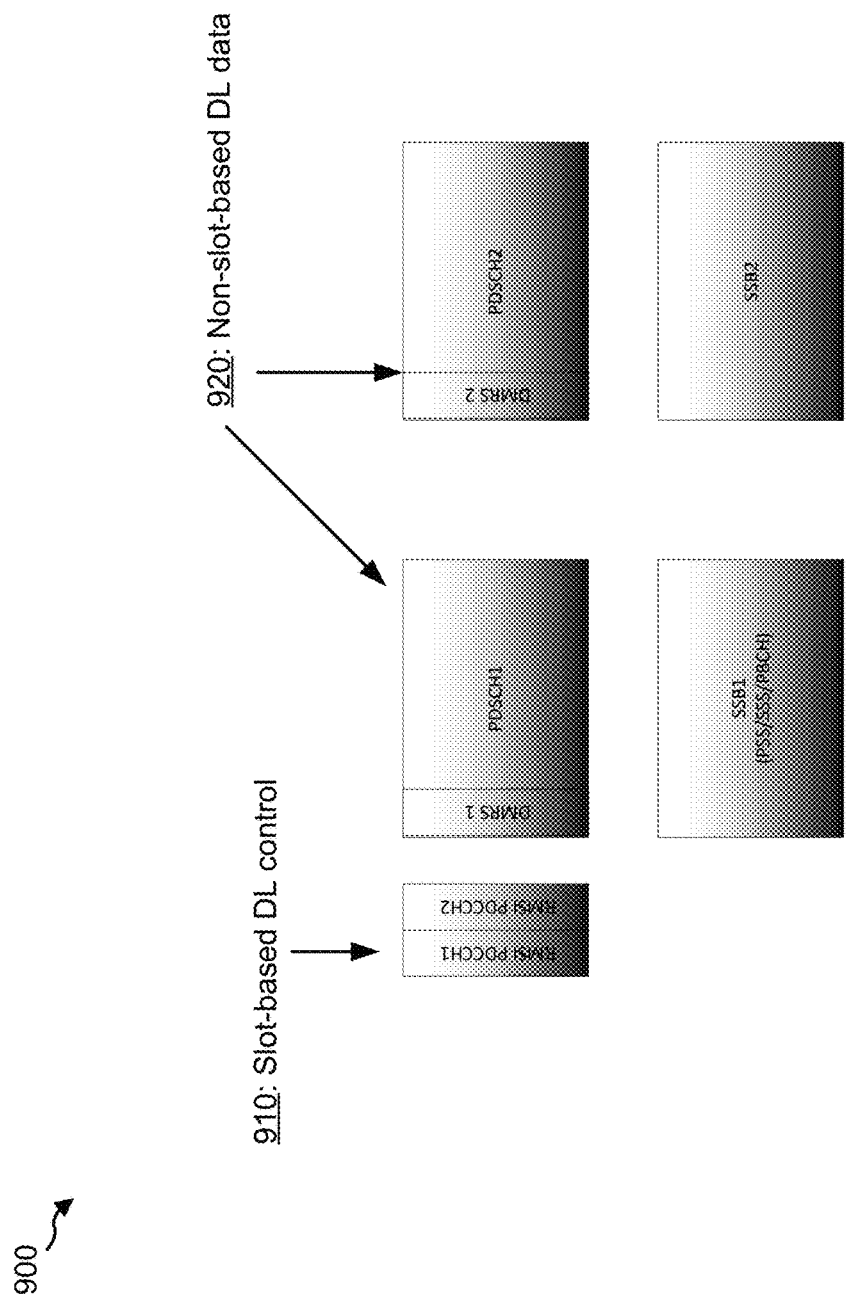
FIGS. 9A and 9B are diagrams illustrating examples of slot-based and non-slot-based control and data configurations, in accordance with various aspects of the present disclosure.
Figure 9B:
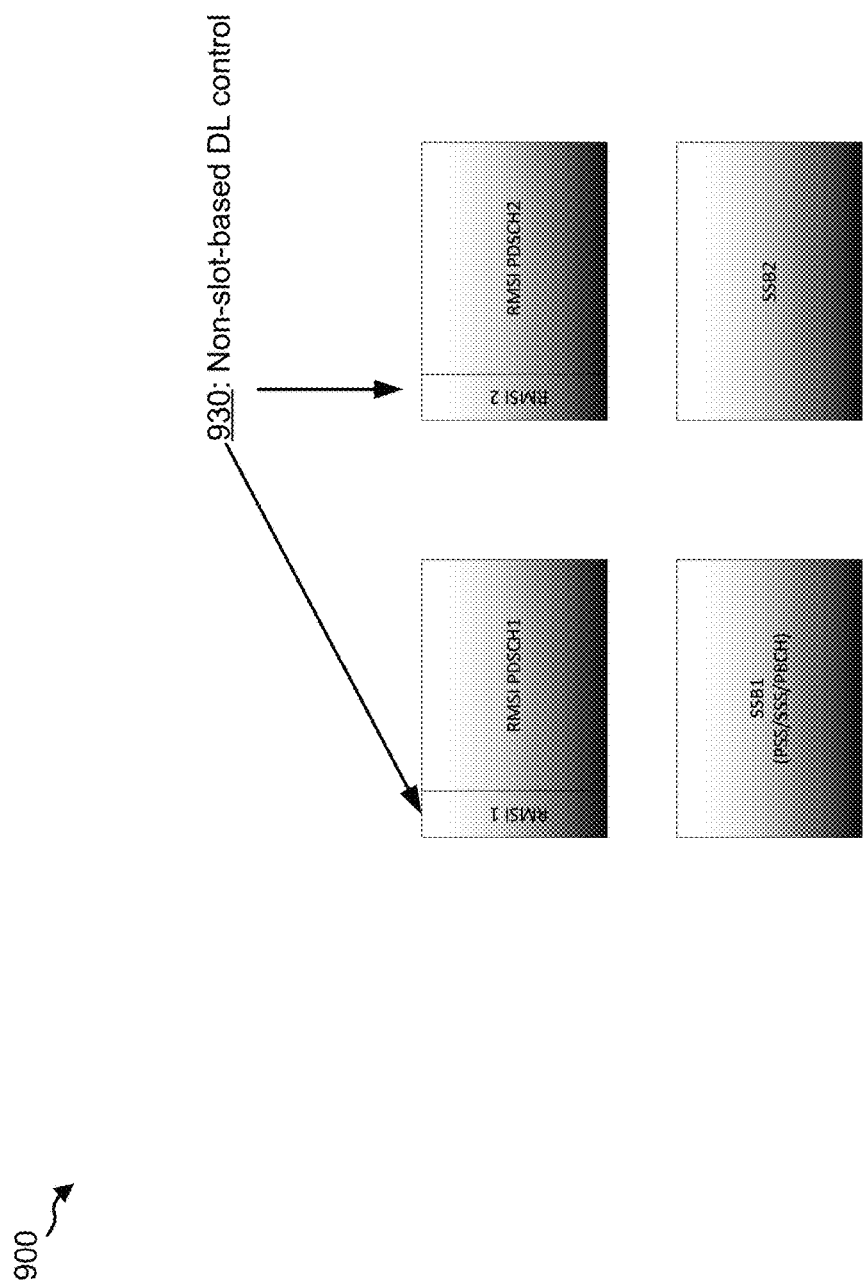

FIGS. 9A and 9B are diagrams illustrating examples 900 of slot-based and non-slot-based control and data configurations, in accordance with various aspects of the present disclosure.

As shown in FIG. 9A, and by reference number 910, in some aspects, control information may use a slot-based control configuration. In a slot-based control configuration, the control information is provided in a PDCCH of a slot. Here, the control information includes remaining minimum system information (RMSI) in two PDCCHs (e.g., PDCCH1 and PDCCH2), corresponding to communications that are provided in a PDSCH1 and a PDSCH2, respectively.

As shown by reference number 920, the communications may be associated with a non-slot-based data configuration. In a non-slot-based data configuration, a reference signal for a communication (shown as DMRS 1 and DMRS 2 for PDSCH1 and PDSCH2, respectively) may be provided in a first symbol of the communication. In some aspects, one or more additional DMRS may be transmitted in later symbols (e.g., PDSCH symbols). For example, in a non-slot-based data configuration, a Type B DMRS may be used, wherein a first DMRS symbol occurs on a first symbol of the corresponding PDSCH. In some aspects, for a slot-based data configuration, a Type A DMRS may be used, wherein the reference signal is provided in a first symbol after the DL control region. As further shown, in FIG. 9A, in some aspects, communications may be multiplexed. For example, the PDSCH1 and PDSCH2 may be multiplexed with SSB1 and SSB2.

As shown in FIG. 9B, and by reference number 930, in some aspects, a non-slot-based control configuration may be used. In the non-slot-based control configuration, control information may be provided in a location other than a PDCCH of the slot. Here, the control information (shown as RMSI 1 for PDSCH1 and RMSI 2 for PDSCH2) is provided in a first symbol of a corresponding communication. In some aspects, the control information may be provided in a different location for the non-slot-based control configuration. For example, the control information may be provided in any symbol of a slot in which a corresponding communication is transmitted or received, or in a slot before or after the slot in which the corresponding communication is transmitted or received.

In some aspects, such as EMBB, a slot-based PDCCH may be used with a slot-based PDSCH or PUSCH. In some aspects, a slot-based PDCCH may be used with a combination of slot-based and non-slot-based PDSCH or PUSCH. For example, and as shown in FIGS. 9A and 9B, a RMSI PDSCH may be frequency division multiplexed with a synchronization signal block (SSB). This may also be applicable for beam-based millimeter wave applications. In some aspects, a non-slot-based PDCCH may be used with a non-slot-based PDSCH or PUSCH. This may be used for ultra-reliable low latency communication (URLLC). In some aspects, a slot-based PDCCH may be used with a slot-based PDSCH or PUSCH, and a non-slot-based PDCCH may be used with a non-slot-based PDSCH or PUSCH. This may be used for EMBB+URLLC class devices. In some aspects, a slot-based PDCCH may be used with a combination of slot-based and non-slot-based PDSCH or PUSCH, and a non-slot-based PDCCH may be used with a non-slot-based PDSCH or PUSCH. This may be used for beam-based EMBB+URLLC.

As indicated above, FIGS. 9A and 9B are provided as examples. Other examples are possible and may differ from what was described with respect to FIGS. 9A and 9B.

Figure 10:
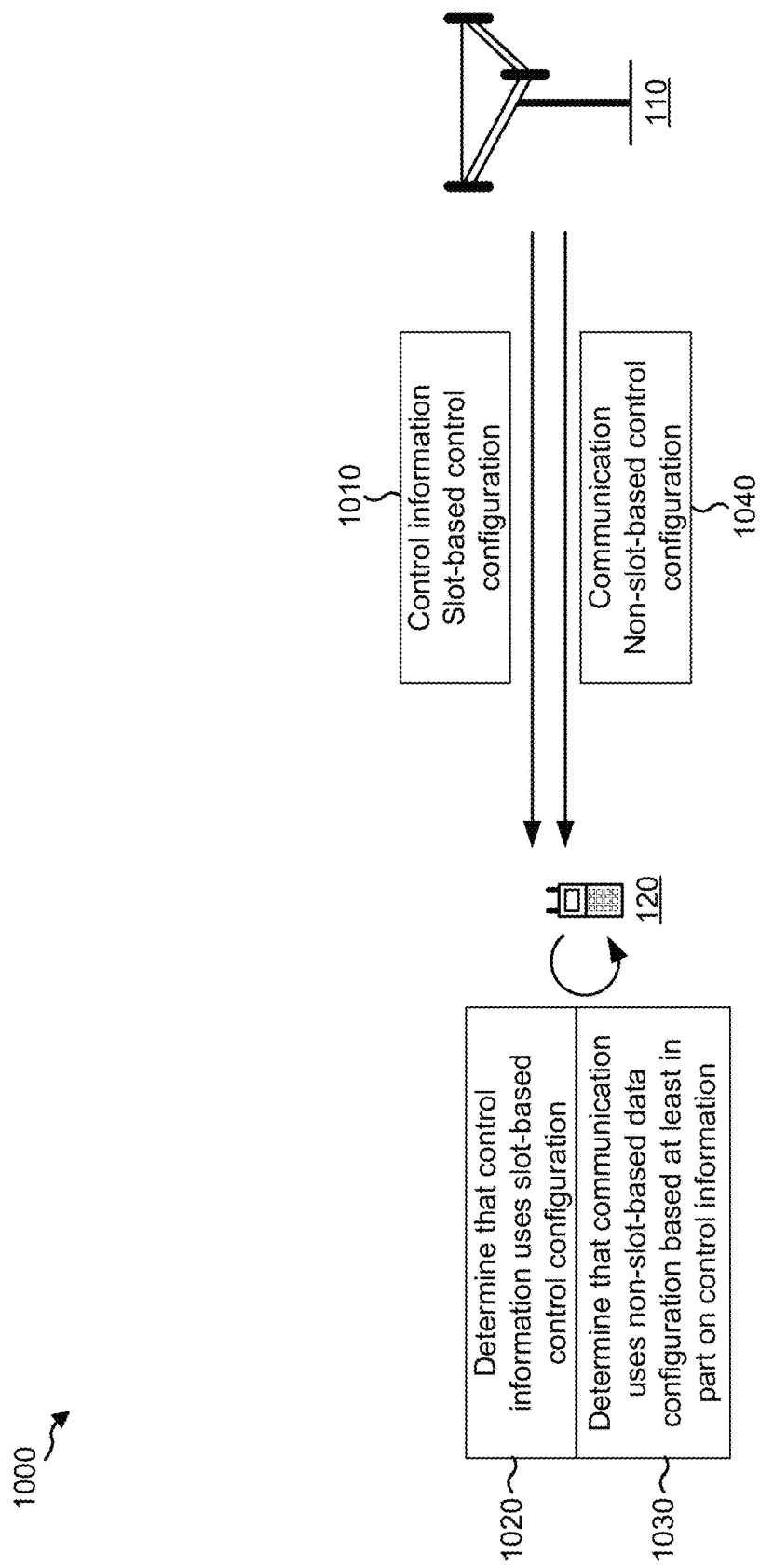
FIG. 10 is a diagram illustrating an example of determination of slot-based and non-slot-based control and data configurations for control information and/or a communication, in accordance with various aspects of the present disclosure.

FIG. 10 is a diagram illustrating an example 1000 of determination of slot-based and non-slot-based control and data configurations for control information and/or a communication, in accordance with various aspects of the present disclosure.

As shown in FIG. 10, and by reference number 1010, a BS 110 may transmit control information to a UE 120. As further shown, the control information may have a slot-based control configuration. For example, the control information may be transmitted in a DL control region of a slot. In some aspects, the control information may have a non-slot-based control configuration. In some aspects, the control information may include scheduling information (e.g., a grant) for the UE 120. The UE 120 may need to determine which control configuration is used for the control information to determine an appropriate timeline for processing the control information, as described in more detail below.

As shown by reference number 1020, the UE 120 may determine that the control information uses the slot-based control configuration. For example, the UE 120 may determine whether the control information uses the slot-based control configuration or a non-slot-based control configuration. The UE 120 may determine whether the control information uses the slot-based control configuration or the non-slot-based control configuration to determine an appropriate timeline for processing the control information and/or a communication associated with the control information.

In some aspects, the UE 120 may determine the control configuration based at least in part on a downlink control information (DCI) format of the control information. For example, a first DCI format or set of DCI formats may be associated with the slot-based control configuration, and a second DCI format or set of DCI formats may be associated with the non-slot-based control configuration. When the UE 120 decodes control information of the first DCI format, the UE 120 may determine that the control information is of the slot-based control configuration. When the UE 120 decodes control information of the second DCI format, the UE 120 may determine that the control information is of the non-slot-based control configuration.

In some aspects, the UE 120 may determine the control configuration based at least in part on an explicit indication in the control information. For example, the control information may include one or more bits that may indicate whether the control information is of the slot-based control configuration or the non-slot-based control configuration. When the one or more bits are set to a value that indicates that the control information is of the slot-based control configuration, the UE 120 may determine that the control information is of the slot-based control configuration. When the one or more bits are set to a value that indicates that the control information is of the non-slot-based control configuration, the UE 120 may determine that the control information is of the non-slot-based control configuration. The above aspect (and any other aspect described herein) may be applicable for compact control information (e.g., compact DCI) as well as non-compact control information (e.g., non-compact DCI).

In some aspects, the UE 120 may determine the control configuration based at least in part on a search space in which the control information is received and/or based at least in part on monitoring occasions corresponding to the slot-based control configuration and the non-slot-based control configuration. A UE may monitor all common search spaces and a set of UE-specific search spaces associated with the UE. Therefore, one or more search spaces may be said to be associated with a monitoring occasion. For example, a first search space may be used for control information of the slot-based control configuration, and a second search space may be used for control information of the non-slot-based control configuration. As another example, a search space in a DL control region of a slot may be used for control information of the slot-based control configuration, and a search space that is not in the DL control region may be used for control information of the non-slot-based control configuration. In some aspects, a first monitoring occasion (e.g., a group of one or more search spaces) may be associated with a slot-based configuration. A second monitoring occasion (e.g., another group of one or more search spaces) may be associated with a non-slot-based configuration. The UE may determine whether control information is associated with a slot-based configuration or a non-slot-based configuration based at least in part on whether the control information is received in the first monitoring occasion or the second monitoring occasion.

In some aspects, the UE 120 may perform blind decoding to identify the control information. In such a case, when blind decoding candidates for a search space for the slot-based control configuration and a search space for the non-slot-based control configuration are identical, a configured one of the blind decoding candidates may be prioritized for decoding. For example, in some cases, the UE 120 may identify two blind decoding candidates in respective search spaces, wherein one of the blind decoding candidates is of a slot-based control configuration and the other of the blind decoding candidates is of a non-slot-based control configuration. In such a case, the UE 120 may prioritize one of the blind decoding candidates based at least in part on a corresponding control configuration. For example, the UE 120 may only decode a blind decoding candidate associated with a slot-based control configuration based at least in part on the UE 120 prioritizing blind decoding candidates corresponding to the slot-based control configuration. In this way, efficiency of the blind decoding process may be improved when control information of a particular control configuration is likely to be received, thereby conserving processing resources of the UE 120.

As shown by reference number 1030, the UE 120 may determine that a communication corresponding to the control information (e.g., a communication using resources granted by the control information) is associated with a non-slot based data configuration. For example, the UE 120 may determine whether the communication is associated with the non-slot-based data configuration or a slot-based data configuration. The UE 120 may determine the data configuration of the communication in order to determine a location of a reference signal associated with the communication. For example, when the communication is of a slot-based data configuration, a Type A DMRS may be used, and when the communication is of a non-slot-based data configuration, a Type B DMRS may be used.

In some aspects, the UE 120 may determine the data configuration based at least in part on a configuration of the UE 120. For example, the UE 120 may be configured to use a particular data configuration for the communication using radio resource control (RRC) signaling. In some aspects, the UE 120 may determine the data configuration based at least in part on a control resource set (CORESET) or search space (SS) configuration of the control information associated with the communication. For example, when the control information is provided in a CORESET or SS of a first configuration, the UE 120 may determine that the corresponding communication is of a slot-based data configuration, and when the control information is provided in a CORESET or SS of a second configuration, the UE 120 may determine that the corresponding communication is of a non-slot-based data configuration. Additionally, or alternatively, the UE 120 may determine the data configuration based at least in part on a CORESET or SS in which the control information is received. For example, a first set of CORESETs or SSs may be designated for control information for the slot-based data configuration, and a second set of CORESETs or SSs may be designated for control information for the non-slot-based data configuration.

In some aspects, the UE 120 may determine the data configuration based at least in part on a control configuration of the control information. For example, when the control information is of a non-slot-based control configuration, the UE 120 may determine that the corresponding communication is of a non-slot-based data configuration.

In some aspects, the UE 120 may determine the data configuration based at least in part on a DCI format of the control information. For example, a first DCI format of control information may correspond to a slot-based data configuration, and a second DCI format of control information may correspond to a non-slot-based data configuration. In some aspects, the UE 120 may determine the data configuration based at least in part on an indication in the control information. For example, the control information may include one or more bits which may indicate whether the communication is of a slot-based data configuration or a non-slot-based data configuration.

In some aspects, the control information may be compact control information, such as a compact DCI, which may be termed a fallback DCI. A compact DCI may be shorter than a typical DCI. In such a case, the UE 120 may determine some parts of a data configuration of the communication based at least in part on a predefined rule. For example, the UE 120 may determine that communications associated with a compact DCI are always of a slot-based data configuration, or may determine that communications associated with the compact DCI are always of a non-slot-based data configuration. This may conserve resources of the compact DCI, and thus network resources, that would otherwise be used to indicate the data configuration. In some aspects, the compact DCI may explicitly or implicitly indicate the data configuration. As shown by reference number 1040, the UE 120 may receive the communication associated with the non-slot-based data configuration. For example, the UE 120 may receive the communication in a PDSCH. In some aspects, the UE 120 may transmit the communication. For example, the UE 120 may transmit the communication in a PUSCH. In some aspects, the UE 120 may detect or transmit a reference signal (e.g., DMRS) associated with the communication based at least in part on a data configuration of the communication. For example, when the communication is of a slot-based data configuration, the UE 120 may detect or transmit the reference signal in one location, and when the communication is of a non-slot-based data configuration, the UE 120 may detect or transmit the reference signal in another location.

As indicated above, FIG. 10 is provided as an example. Other examples are possible and may differ from what was described with respect to FIG. 10.

FIG. 11 is a diagram illustrating an example process 1100 performed, for example, by a UE, in accordance with various aspects of the present disclosure. Example process 1100 is an example where a UE (e.g., UE 120) performs determination of slot-based and non-slot-based control and data configurations for control information and/or a communication.

As shown in FIG. 11, in some aspects, process 1100 may include receiving control information for a communication (block 1110). For example, the UE (e.g., using antenna 252, DEMOD 254, MIMO detector 256, receive processor 258, controller/processor 280, and/or the like) may receive control information for a communication. In some aspects, the UE may receive the control information in a DL control portion of a slot (e.g., when the control information is of a slot-based control configuration or a non-slot-based control configuration). In some aspects, the UE may receive the control information in a data portion of a slot (e.g., when the control information is of a non-slot-based control configuration).

As shown in FIG. 11, in some aspects, process 1100 may include determining whether the control information is associated with a slot-based control configuration or a non-slot-based control configuration based at least in part on the control information (block 1120). For example, the UE (e.g., using controller/processor 280 and/or the like) may determine whether the control information is associated with a slot-based control configuration or a non-slot-based control configuration. The determination of the control information's control configuration is described in more detail in connection with FIG. 10, above.

As shown in FIG. 11, in some aspects, process 1100 may include determining whether the communication is associated with a slot-based data configuration or a non-slot-based data configuration (block 1130). For example, the UE (e.g., using controller/processor 280 and/or the like) may determine whether the communication associated with the control information is associated with a slot-based data configuration or a non-slot-based data configuration, as described in more detail above. This may allow the UE to determine when a reference signal (e.g., DMRS) of the communication is to be transmitted or received.

Process 1100 may include additional aspects, such as any single aspect or any combination of aspects described below and/or in connection with one or more other processes described elsewhere herein.

In some aspects, determining whether the control information is associated with the slot-based control configuration or the non-slot-based control configuration is based at least in part on a downlink control information (DCI) format of the control information. In some aspects, determining whether the control information is associated with the slot-based control configuration or the non-slot-based control configuration is based at least in part on an explicit indication in the control information.

In some aspects, determining whether the control information is associated with the slot-based control configuration or the non-slot-based control configuration is based at least in part on a monitoring occasion associated with a search space in which the control information is to be received. In some aspects, when blind decoding candidates for a search space for the slot-based control configuration and a search space for the non-slot-based control configuration are identical, a configured one of the blind decoding candidates is prioritized for decoding.

In some aspects, determining whether the communication is associated with the slot-based data configuration or the non-slot-based data configuration is based at least in part on a radio resource control configuration, a control resource set configuration, or a search space configuration of the UE. In some aspects, determining whether the communication is associated with the slot-based data configuration or the non-slot-based data configuration is based at least in part on whether the control information is associated with the slot-based control configuration or the non-slot-based control configuration. In some aspects, when the control information is associated with the non-slot-based control configuration, the communication is associated with the non-slot-based data configuration.

In some aspects, determining whether the communication is associated with the slot-based data configuration or the non-slot-based data configuration is based at least in part on a downlink control information (DCI) format of the control information. In some aspects, determining whether the communication is associated with the slot-based data configuration or the non-slot-based data configuration is based at least in part on an indication in downlink control information (DCI). In some aspects, determining whether the communication is associated with the slot-based data configuration or the non-slot-based data configuration is based at least in part on an explicit indication in the control information. In some aspects, the slot-based data configuration is associated with a first type or location of a reference signal, and wherein the non-slot-based data configuration is associated with a second type or location of the reference signal. In some aspects, the slot-based control configuration is provided in a control resource set that occurs in a downlink control region of a slot, and the non-slot-based control configuration is provided in a control resource set that occurs in any region of a slot.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node, comprising:
    transmitting downlink control information for a communication,
        the downlink control information including an explicit indication, comprising one or more bits, indicating whether the communication is associated with a slot-based data configuration where a Type A demodulation reference signal (DMRS) is used or a non-slot-based data configuration where a Type B DMRS is used; and
    communicating a DMRS associated with the communication based at least in part on whether the communication is associated with the slot-based data configuration or the non-slot-based data configuration.

2. The method of claim 1, wherein radio resource control (RRC) signaling is used to configure a user equipment (UE) to determine whether the communication is associated with the slot-based data configuration or the non-slot-based data configuration.

3. The method of claim 1, wherein communicating the DMRS associated with the communication includes:
    transmitting the DMRS associated with the communication based at least in part on whether the communication is associated with the slot-based data configuration or the non-slot-based data configuration.

4. The method of claim 1, wherein communicating the DMRS associated with the communication includes:
    receiving the DMRS associated with the communication based at least in part on whether the communication is associated with the slot-based data configuration or the non-slot-based data configuration.

5. The method of claim 1, wherein the one or more bits are set to a first value when the communication is associated with the slot-based data configuration, and
    wherein the one or more bits are set to a second value when the communication is associated with the non-slot-based data configuration.

6. The method of claim 1, wherein the downlink control information is compact downlink control information.

7. The method of claim 1, wherein, for the slot-based data configuration, the DMRS is provided in a first symbol after a downlink control region of a slot.

8. The method of claim 1, wherein, for the non-slot-based data configuration, a first DMRS symbol occurs on a first symbol of a physical downlink shared channel (PDSCH).

9. A network node for wireless communication, comprising:
    a memory; and
    one or more processors coupled to the memory the one or more processors configured to:
        transmit downlink control information for a communication,
            the downlink control information including an explicit indication, comprising one or more bits, indicating whether the communication is associated with a slot-based data configuration where a Type A demodulation reference signal (DMRS) is used or a non-slot-based data configuration where a Type B DMRS is used; and
        communicate a DMRS associated with the communication based at least in part on whether the communication is associated with the slot-based data configuration or the non-slot-based data configuration.

10. The network node of claim 9, wherein radio resource control (RRC) signaling is used to configure a user equipment (UE) to determine whether the communication is associated with the slot-based data configuration or the non-slot-based data configuration.

11. The network node of claim 9, wherein, to communicate the DMRS associated with the communication, the one or more processors are configured to:
    transmit the DMRS associated with the communication based at least in part on whether the communication is associated with the slot-based data configuration or the non-slot-based data configuration.

12. The network node of claim 9, wherein, to communicate the DMRS associated with the communication, the one or more processors are configured to:
receive the DMRS associated with the communication based at least in part on whether the communication is associated with the slot-based data configuration or the non-slot-based data configuration.

13. The network node of claim 9, wherein the one or more bits are set to a first value when the communication is associated with the slot-based data configuration, and
wherein the one or more bits are set to a second value when the communication is associated with the non-slot-based data configuration.

14. The network node of claim 9, wherein the downlink control information is compact downlink control information.

15. The network node of claim 9, wherein, for the slot-based data configuration, the DMRS is provided in a first symbol after a downlink control region of a slot.

16. The network node of claim 9, wherein, for the non-slot-based data configuration, a first DMRS symbol occurs on a first symbol of a physical downlink shared channel (PDSCH).

17. A non-transitory computer-readable medium storing instructions for wireless communication that when executed by one or more processors of a network node, cause the network node to:
transmit downlink control information for a communication,
the downlink control information including an explicit indication, comprising one or more bits, indicating whether the communication is associated with a slot-based data configuration where a Type A demodulation reference signal (DMRS) is used or a non-slot-based data configuration where a Type B DMRS is used; and
communicate a DMRS associated with the communication based at least in part on whether the communication is associated with the slot-based data configuration or the non-slot-based data configuration.

18. The non-transitory computer-readable medium of claim 17, wherein radio resource control (RRC) signaling is used to configure a user equipment (UE) to determine whether the communication is associated with the slot-based data configuration or the non-slot-based data configuration.

19. The non-transitory computer-readable medium of claim 17, wherein the instructions, when executed by the one or more processors to communicate the DMRS associated with the communication, cause the network node to:
transmit the DMRS associated with the communication based at least in part on whether the communication is associated with the slot-based data configuration or the non-slot-based data configuration.

20. The non-transitory computer-readable medium of claim 17, wherein the instructions, when executed by the one or more processors to communicate the DMRS associated with the communication, cause the network node to:
receive the DMRS associated with the communication based at least in part on whether the communication is associated with the slot-based data configuration or the non-slot-based data configuration.

21. The non-transitory computer-readable medium of claim 17, wherein the one or more bits are set to a first value when the communication is associated with the slot-based data configuration, and
wherein the one or more bits are set to a second value when the communication is associated with the non-slot-based data configuration.

22. The non-transitory computer-readable medium of claim 17, wherein the downlink control information is compact downlink control information.

23. The non-transitory computer-readable medium of claim 17, wherein, for the slot-based data configuration, the DMRS is provided in a first symbol after a downlink control region of a slot.

24. The non-transitory computer-readable medium of claim 17, wherein, for the non-slot-based data configuration, a first DMRS symbol occurs on a first symbol of a physical downlink shared channel (PDSCH).

25. An apparatus for wireless communication, comprising:
means for transmitting downlink control information for a communication,
the downlink control information including an explicit indication, comprising one or more bits, indicating whether the communication is associated with a slot-based data configuration where a Type A demodulation reference signal (DMRS) is used or a non-slot-based data configuration where a Type B DMRS is used; and
means for communicating a DMRS associated with the communication based at least in part on whether the communication is associated with the slot-based data configuration or the non-slot-based data configuration.

26. The apparatus of claim 25, wherein radio resource control (RRC) signaling is used to configure a user equipment (UE) to determine whether the communication is associated with the slot-based data configuration or the non-slot-based data configuration.

27. The apparatus of claim 25, wherein the means for communicating the DMRS associated with the communication includes:
means for transmitting the DMRS associated with the communication based at least in part on whether the communication is associated with the slot-based data configuration or the non-slot-based data configuration.

28. The apparatus of claim 25, wherein the means for communicating the DMRS associated with the communication includes:
means for receiving the DMRS associated with the communication based at least in part on whether the communication is associated with the slot-based data configuration or the non-slot-based data configuration.

29. The apparatus of claim 25, wherein the one or more bits are set to a first value when the communication is associated with the slot-based data configuration, and
wherein the one or more bits are set to a second value when the communication is associated with the non-slot-based data configuration.

30. The apparatus of claim 25, wherein the downlink control information is compact downlink control information.

* * * * *